Feb. 10, 1942.  E. NÖTHE  2,272,574
MEANS FOR INDICATING THE AMOUNT OF AMMUNITION FIRED FROM FIREARMS
Filed July 21, 1939
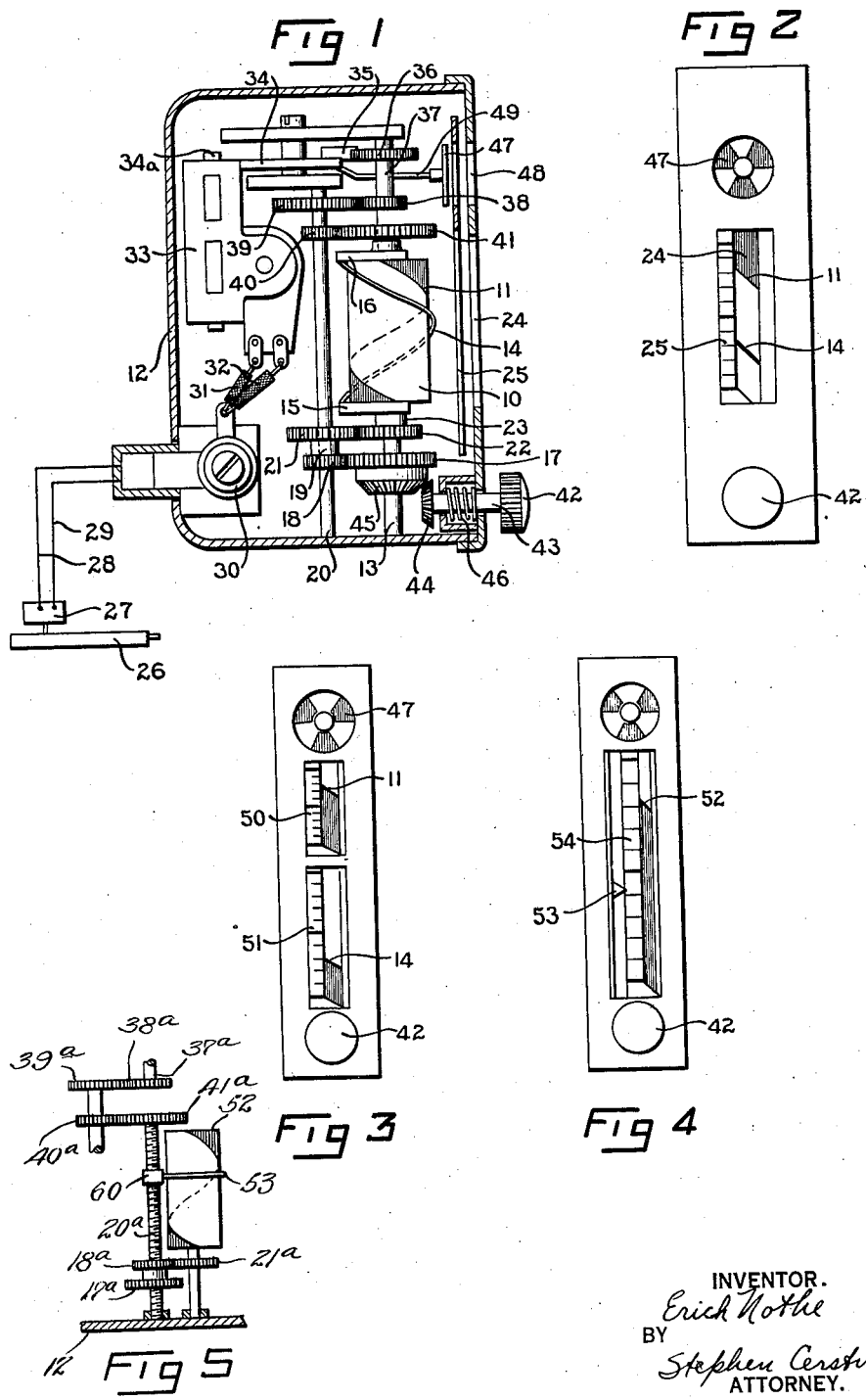
INVENTOR.
Erich Nöthe
BY
Stephen Cerstvik
ATTORNEY.

Patented Feb. 10, 1942

2,272,574

UNITED STATES PATENT OFFICE 2,272,574

MEANS FOR INDICATING THE AMOUNT OF AMMUNITION FIRED FROM FIREARMS

Erich Nöthe, Berlin-Spandau, Germany, assignor to Siemens Apparate und Maschinen Gesellschaft mit beschränkter Haftung, Berlin, Germany, a corporation of Germany Application July 21, 1939, Serial No. 285,811
In Germany March 11, 1939

10 Claims. (Cl. 116—129)

This invention relates to indicating means, and more particularly to means for indicating the number of rounds of ammunition fired from an automatic fire arm.

One of the objects of the invention is to provide means for indicating to a gunner the number of rounds of ammunition available to a gun located at a point remote from the gunner.

Another object is to provide a novel indicator of the above character which is light in weight, small, and therefore especially adapted for use in aircraft.

A further object is to provide a novel indicator of the above character which has means for coarse and for vernier indications.

An additional object is to provide an indicator of the above character which can be read rapidly and accurately.

The above and further objects and novel features will more fully appear from the detailed description when the same is read in connection with the accompanying drawing. It is to be expressly understood, however, that the drawing is for purposes of illustration only and is not intended as a definition of the limits of the invention, reference for this latter purpose being had to the appended claims.

In the drawing, wherein like reference characters refer to like parts throughout the several views, Fig. 1 is a side elevation, partly in section, of one embodiment of the invention;

Fig. 2 is a front elevation of the first embodiment;

Fig. 3 is a front elevation of a second embodiment of the invention;

Fig. 4 is a front elevation of a third embodiment of the invention; and,

Fig. 5 is a fragmental side elevation view illustrating the mounting of the two indicators of Fig. 4.

The forms of the invention illustrated in the accompanying drawing, by way of example, comprise means for indicating the number of rounds of ammunition which have been fired from a gun and hence means for indicating the number of rounds which remain available for the gun. The indicating means includes a coarse helical indicator to which is operatively connected a vernier helical indicator, the helices being rotatably mounted and readable against a suitable scale or scales. Means are provided for automatically actuating the indicators in response to each firing of the gun. The indicator may be mounted, for example, upon the instrument panel of an aircraft.

In the form shown in Fig. 1, a coarse helical indicator is constituted by a cylindrical drum member 10 having marked around the surface thereof a helix 11 which, for purposes of facilitating a rapid reading thereof against a scale to be later described, marks a boundary between areas upon the drum of different colors, preferably black and white. Drum 10 is rotatably mounted within a housing 12 upon a shaft 13.

A helical vernier indicator 14 is provided for fine readings comprising in the form shown a helical wire which is mounted coaxially with and around the drum 10, the wire being spaced at a suitable small distance from the drum to avoid frictional contact therewith, and being mounted at opposite extremities upon arms 15 and 16, which are pivotally arranged about shaft 13.

Means for operatively connecting the coarse and vernier indicators, for example in a ratio of ten revolutions of the vernier for one of the coarse indicator, comprise a gear 17 attached to shaft 13, the gear meshing with a smaller gear 18 upon a hollow shaft 19 which surrounds a central shaft 20. Secured to hollow shaft 19 is another gear 21 which in turn meshes with a gear 22, the latter being attached to a second hollow shaft 23 surrounding shaft 13. Secured to hollow shaft 23 is one of the arms 15 to which one extremity of the helical wire 14 is secured.

A window 24 is provided in housing 12 which exposes a suitable scale 25, and a predetermined small area of the drum 10 and the wire 14. The scale may be provided with numerals, for example, for indicating the number of rounds of ammunition available. Because the indicator 11 need give only a coarse indication, the scale can be constructed much smaller than heretofore possible, the second indicator, which is read upon the same scale in this embodiment, providing a sufficiently precise vernier reading to eliminate the necessity for a larger scale.

Means are provided for operatively connecting the indicator with the actuating apparatus, for example, a machine gun 26 which can be mounted upon an aircraft, comprising an electric current impulse producing device 27 which is energized in response to the movement of some portion of the gun, for example, the gun bolt or the ejecting mechanism. Member 27 is connected electrically by leads 28, 29 to a suitable socket 30 in the housing 12. Socket 30 in turn is connected by leads 31, 32 to an electromagnet 33 having an armature 34 pivotally mounted upon a shaft 34a. The armature is provided with a pawl finger 35 which engages a ratchet wheel 36 upon a shaft 37 to which is secured a gear 38 which in turn meshes with another gear 39 upon the shaft 20. The movement of shaft 20 is communicated to the drum 10 by means of gears 40 and 41 which are respectively mounted upon shafts 20 and 13.

In order that the indicating means may be manually adjusted, for example, to an initial or zero position, suitable means are provided comprising, for example, a hand knob 42 upon a shaft 43 which is rotatably mounted upon housing 12, and which has attached to one extremity thereof a bevel gear 44. The latter is adapted for engaging a second bevel gear 45 which is secured to shaft 13, said engagement being accomplished by axially displacing shaft 43 by manual pressure against a spring 46, which by contact with a washer, for example, upon shaft 43, normally urges said shaft and gear 44 away from the gear 45.

Above window 24 there is provided a disc indicator 47 which can be viewed through a window 48 and which is actuated by means of a bar 49 operatively connected to armature 34. During the firing, armature 34 and consequently disc indicator 47 will oscillate so rapidly that it will not be visible to the naked eye. The disc is so disposed that it is visible when the electromagnet 33 is energized and the gun is in a "ready" condition for firing. Consequently, if the firing of the gun ceases when the electromagnet is not energized, the disc will not be visible and thus will indicate to the gunner, for example, that the bolt or lock of the gun is not in a "ready" position.

In operation, the helical indicators are first set to a predetermined initial position by knob 42. As the gun fires, the current impulse device 27 actuates the electromagnet 33, and the armature 34 is moved a predetermined amount for each round that is fired, thus causing the helical indicators to move in response thereto by means of the above described gear trains.

Instead of arranging the coarse and the vernier indicators as shown in Figs. 1 and 2 wherein a common scale is employed for both, and where the indicators are superposed, it is possible to construct the device whereby the two indicators have individual scales, i. e. 50 for the coarse and 51 for the fine indicators, a suitable gear ratio being maintained therebetween. (Fig. 3.)

A third embodiment may be employed which comprises a vernier indicator constituted by a drum 52 having helical indicia thereon analogous to that of drum 10, and a coarse indicator 53 which is constituted by a pointer, the latter being secured to a nut 60 which is constructed to travel axially only upon a suitable lead screw 20a as shown in Fig. 5. Lead screw 20a is actuated from the firing mechanism in the same manner as is drum 10 of Fig. 1. A suitable gear train, comprising gear 17a secured to lead screw 20a, a gear 18a loosely mounted about lead screw 20a for rotation by gear 17a, and gear 21a, operatively interconnects the drum 52 and lead screw. A common scale 54 is provided against which both the pointer and helix may be read (Fig. 4).

There is thus provided a novel indicator which, due to the very small size, the light weight and the compactness thereof, is especially adapted for being mounted upon the instrument panel of an aircraft. The device is accurate, easily readable at a glance, and dependable in operation.

Although only three embodiments of the present invention have been illustrated and described in detail, it is to be expressly understood that the same is not limited thereto. For example, instead of employing electrical means for operatively interconnecting the actuating device, i. e. the gun in this example and the indicator, it is possible to mechanically interconnect these members. Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the class described, a drum, the latter having a helix marked upon the surface thereof for coarse indications, a vernier indicator comprising a helical surface, means for operatively connecting the drum and helical surface, and means subjected to periodic movement for advancing said drum in one direction only in accordance with the movement of said means.

2. In apparatus of the class described, a drum having helical indicia upon the surface thereof for coarse readings, a housing for said drum having a window therein, the latter exposing a predetermined area of the drum, means subjected to periodic movement for moving said drum in one direction of movement only, a second helical indicia for vernier readings, and means for operatively connecting the second indicia to said means for moving the drum, said last-named means comprising a reduction mechanism whereby said drum and said helical indicia are actuated at a different ratio of movement.

3. In apparatus of the class described, a coarse indicator comprising a rotatable helical surface, a vernier indicator comprising a rotatable helical surface, said surfaces being operatively interconnected, and means for moving said surfaces at a different ratio of movement.

4. In apparatus of the class described, a coarse indicator comprising a rotatable helix, a vernier indicator comprising a rotatable helix, said indicators being coaxially mounted and operatively interconnected, a common scale for the indicators, and means responsive to periodic impulses for actuating said indicators.

5. The combination with a vernier helical indicator of a coarse indicator comprising a pointer, a lead screw, a nut mounted on said lead screw for movement thereby, said pointer being mounted for movement with said nut, means for operatively interconnecting said helical indicator and lead screw, and a common scale for said vernier and coarse indicators.

6. The combination with a helical vernier indicator, of a lead screw, a nut mounted on said lead screw for movement thereby, a pointer mounted for movement with said nut, said pointer comprising a coarse indicator, means for operatively interconnecting said helical indicator and lead screw, a scale for said indicators, and means subjected to periodic impulses for moving said lead screw.

7. In apparatus of the class described, a housing, a rotatably mounted drum within said housing, indicating means moved by said drum, means connected with said drum and actuated intermittently to move the drum angularly an incremental amount, means defining a fine indicator mounted for movement during movement of said drum and actuated by said intermittently actuated means to operate at a different rate of movement from the movement of said drum, and scale means carried by said housing for cooperation with said indicator and indicating means.

8. In apparatus of the class described, a housing, a rotatably mounted drum within said housing, indicating means movable with said drum, means connected with said drum and actuated intermittently to move the drum angularly an incremental amount, helical means defining a fine indicator mounted coaxially with and spaced from said drum, a reduction mechanism actuated by said intermittently actuated means for moving said helical means at a different ratio of movement from the movement of said drum, and scale means carried by said housing for cooperation with said indicator and indicating means.

9. Indicating means including an index means mounted for periodic movement during predetermined intervals of time, a helix mounted coaxially with said index means, and means comprising a reduction mechanism actuated during movement of said index means for moving said helix at a different rate of movement from the movement of the index means.

10. Indicating means including rotatable means, an index operatively connected with said means and periodically movable an incremental amount during rotation of said means during predetermined intervals of time, an indicator mounted for movement during rotation of said means, and a reduction mechanism connecting said means and said indicator and actuated during rotation of said rotatably mounted means for moving said indicator at a different rate of movement from the movement of the rotatable means.

ERICH NÖTHE.